(12) United States Patent
Santos et al.

(10) Patent No.: US 12,513,374 B2
(45) Date of Patent: Dec. 30, 2025

(54) METHOD TO GENERATE A DATABASE FOR SYNCHRONIZATION OF A TEXT, A VIDEO AND/OR AUDIO MEDIA

(71) Applicant: Universidade Do Minho, Braga (PT)

(72) Inventors: Pedro Afonso Rodrigues Santos, Ovar (PT); Irenel Lopo Da Silva, Santa Tecla (AO); Nicolas Francisco Lori, Almada (PT); Jose Manuel Ferreira Machado, Guimarães (PT)

(73) Assignee: Universidade Do Minho, Braga (PT)

( * ) Notice: Subject to any disclaimer, the term of this patent is extended or adjusted under 35 U.S.C. 154(b) by 91 days.

(21) Appl. No.: 18/536,487

(22) Filed: Dec. 12, 2023

(65) Prior Publication Data

US 2024/0196067 A1 Jun. 13, 2024

(30) Foreign Application Priority Data

Dec. 12, 2022 (PT) .......................................... 118387

(51) Int. Cl.
*H04N 21/8547* (2011.01)
*G06F 16/75* (2019.01)
*G06F 40/10* (2020.01)

(52) U.S. Cl.
CPC ......... *H04N 21/8547* (2013.01); *G06F 16/75* (2019.01); *G06F 40/10* (2020.01)

(58) Field of Classification Search
CPC ...... H04N 21/8547; G06F 16/75; G06F 40/10
USPC ....................................................... 386/241
See application file for complete search history.

(56) References Cited

U.S. PATENT DOCUMENTS

| | | | |
|---|---|---|---|
| 8,988,611 B1 | 3/2015 | Terry | |
| 9,575,945 B2 * | 2/2017 | Mansfield | ............... G06F 40/10 |
| 9,992,556 B1 | 6/2018 | Price et al. | |
| 10,237,229 B2 * | 3/2019 | Bastide | ................... H04L 51/52 |
| 10,721,377 B1 | 7/2020 | Wu et al. | |
| 11,107,503 B2 | 8/2021 | Wu et al. | |
| 11,736,654 B2 | 8/2023 | Wu et al. | |
| 11,783,860 B2 | 10/2023 | Wu et al. | |
| 12,125,487 B2 * | 10/2024 | Bradley | ................... G10L 15/26 |
| 12,198,700 B2 * | 1/2025 | Karia | ................. H04N 21/4307 |
| 2007/0244700 A1 * | 10/2007 | Kahn | ...................... G10L 15/22 |
| | | | 704/E15.04 |
| 2020/0396357 A1 | 12/2020 | Wu et al. | |

(Continued)

FOREIGN PATENT DOCUMENTS

WO WO 2020/248124 12/2020
WO WO 2021/068105 4/2021

*Primary Examiner* — Helen Shibru (57) ABSTRACT

The present document discloses a method to generate a database for synchronization of a text, a video and/or audio media, namely a computer-implemented method to generate a database for synchronization of a text, a video and/or audio media with a video stream to be generated using said database, comprising the steps of: receiving an input text; splitting the input text into text segments; clustering the text segments into at least one text group; labelling each text segment with a sequential timestamp; and, storing each text segment with the label on a data record wherein the text group comprises a time interval label which corresponds to the duration of at least a portion of a video and/or audio media. It is further disclosed a method for retrieving information from said database, a system, and a computer program thereof.

13 Claims, 6 Drawing Sheets

(56) References Cited

U.S. PATENT DOCUMENTS

2021/0104260 A1     4/2021   Wu et al.
2021/0398565 A1   12/2021   Wu et al.
2025/0217572 A1*   7/2025   DeCharms .......... G10L 13/0335

* cited by examiner

METHOD TO GENERATE A DATABASE FOR SYNCHRONIZATION OF A TEXT, A VIDEO AND/OR AUDIO MEDIA

RELATED APPLICATION

This application claims the benefit of priority of Portugal Patent Application No. 118387 filed on Dec. 12, 2022, the contents of which are incorporated by reference as if fully set forth herein in their entirety.

FIELD AND BACKGROUND OF THE INVENTION

The present disclosure relates to a method to generate a database for synchronization of a text, a video and/or audio media, in particular for the field of graphical computation, more specifically to the development of animated films from screenplays.

It is further disclosed a method for retrieving information from said database.

The method disclosed allows the synchronization of text elements from a screenplay with video resources that are used in a 3D animating/modelling software to create animated shorts and films.

The development of animation movies from a screenplay text is a very relevant and useful tool for the decisions about the funding, production and content of a movie; but such a development usually requires the use of a vast amount of people and resources, the present disclosure aims at drastically reducing the required amount of both people and resources.

As screenwriters develop the characters, the world and the flow of the narrative, it is important to separate each element to help distinguish what is what. For shows or short films, it is very easy to distinguish the different elements from the screenplay format, however, if a writer is determined to write a long and complex script, it will be much more difficult and time-consuming to read the whole script.

Graphical computational methods exist to help screenwriters and filmmakers make low-cost animation movies straight from the screenplay but they require many resources, hence making them more user-friendly to people that are new to the storytelling and the animation industry will help them gain autonomy and be able to produce on their own an animation movie straight from a screenplay text, thus without needing to have a strong support by the industry nor a strong financial backing.

Screenwriters can visualize their film and open many creative ways for its development.

Regarding the usage of functional Magnetic Resonance Imaging (fMRI) in clinical applications, recent approaches have indicated that it is useful for both neuroscience and medicine to have a form of creating individually-tailored fMRI-compatible audio-visual stimuli that is controlled by that individual's characteristics. However, one of the main problems for achieving that is that it would require to have individually-tailored films for each pathology which is tremendously costly using standard animation movie-making technologies, the present disclosure proposes a much cheaper form of making such individually-tailored films for each pathology.

Document U.S. Pat. No. 9,992,556 B1 discloses a method that generates storyboards by extracting text from a screenplay, in which it could include sound effects or spoken dialogue. The present disclosure is not affected by this patent as what is being disclosed here is a method for creating a full animation movie from a screenplay, not the creation of a more extensive screenplay appropriate for improved recording-devices integration as was disclosed in Document U.S. Pat. No. 9,992,556 B1.

Document WO2020248124 A1 and WO2021068105 A1 also reports methods that consist of a pre-production subsystem (to receive information about a storyline, cameras, cast, and so on); a production subsystem (to receive the scripts from the previous system and determine constraints for each scenes); and a post-production subsystem configured to receive the footages from the production subsystem for performing video and audio editing. The present disclosure is not affected by this patent as what is being disclosed here is a method for creating a full animation movie from a screenplay, not the creation of a more extensive screenplay that is capable of integrating storyline, cameras, and cast so as to determine the constraints for each scene by using a production subsystem for performing video and audio editing as was disclosed in Documents WO2020248124 A1 and WO2021068105 A1.

Document U.S. Pat. No. 8,988,611 B1 discloses a system that includes an actor-defined scene input data stored on the memory that defines scenes to be included in the movie. This method includes a screenplay module (generates a screenplay that includes a sequence of scenes from the input data); a virtual director module (communicates with movie-making equipment at a movie set where the movie is shot and provides visual and audio cues to the actor); and a movie compiler module (receives video and audio data from the moviemaking equipment and compiles the movie). The present disclosure is not affected by this patent as what is being disclosed here is a method for creating a full animation movie from a screenplay, not the creation of an actor-centred sub-set of movie scenes combined with all camera shots for that actor and corresponding audio footage aiming at an improved communication between actor and "movie-making equipment plus movie set integrated system" as was disclosed in Document U.S. Pat. No. 8,988,611 B1.

SUMMARY OF THE INVENTION

The present document discloses a computer-implemented method to generate a database for synchronization of a text, a video and/or audio media with a video stream to be generated using said database, comprising the steps of: receiving an input text; splitting the input text into text segments; clustering the text segments into at least one text group; labelling each text segment with a sequential timestamp; and, storing each text segment with the label on a data record; wherein the input text is split for each line break, tab, space, text column, or their combination; wherein a text group comprises at least one text segment; wherein the text group comprises a time interval label; wherein the time interval of the text group corresponds to the duration of at least a portion of a video and/or audio media.

In an embodiment, the time interval label of a text group comprises the timestamp of the first text segment and the timestamp of the last text segment.

In an embodiment, the time interval label of a text group is provided by a user.

In an embodiment, a text group corresponds to a collection of a film editing software, wherein the collection is a movie scene, times of day, and characters.

In an embodiment, the text group represents a movie scene, a time of day, an action line, a dialogue line, a character, a musical score, a sound effect, or a combination of any of the previous.

In an embodiment, the database comprises only one text group.

In an embodiment, the input text is generated from a speech or narration by a user to text.

In an embodiment, the method further comprises a preprocessing step of the input text, preferably by converting a docx, pdf, or txt file.

In an embodiment, the input text is a screenplay.

It is further disclosed, a computer-implemented method for retrieving information from said database, by a user selection on a video and/or audio media comprising the steps: selecting a frame from said video and/or audio media; identifying a timestamp of said frame; retrieving from said database the text group which comprises that timestamp; and, outputting the text group related with the selected frame.

In an embodiment, the method for retrieving information from said database further comprising: receiving a text input from a user; adding the text input to a text group.

In an embodiment, the method for retrieving information from said database further comprising: receiving an audio media from a user; overlapping the received audio media with at least a portion of the audio of the video on said timestamp.

It is further disclosed a system to generate a database for synchronization of a text, a video and/or audio media, comprising the system comprising an electronic data processor arranged to carry out the described method.

It is also disclosed a computer program product embodied in a non-transitory computer readable medium and comprising computer instructions to carry out the described method.

In an embodiment, the disclosed method is used for developing a film through information requires a video editing program, e.g., Blender add-on that makes animated films with the use of video editing and a 3D computer graphics tool from Blender itself.

An example is herein described, first, if the screenplay file is not yet in docx format but in pdf format, it is then transformed into a screenplay in docx file by using commonly available software products. The screenplay in docx is then processed by a custom-screenplay software, so as to create a custom-screenplay in docx format which can be saved in pdf format by using commonly available software products. Using the custom-screenplay software, from the custom-screenplay in docx format a copy is made to a custom-screenplay Notebook in txt format.

In an embodiment, the custom-screenplay software receives all the information that a user gives via command lines or speech recognition based of the existing python libraries, and with words or letters, e.g., yes or no, it selects and changes the format of the screenplay, whether it is the positioning of the lines or the font text. In a further embodiment, it also deals with the conversion of the document into other formats such as pdf, docx, or txt. As for the database, the software requires an input from a user, and creates tables in the worksheet by collecting data from the text document, and the analysis of the script with a text-to-speech tool.

Document WO2020248124 A1 or WO2021068105 A1, discloses such a custom-screenplay software, consisting of several production subsystems such as receiving information about the story, and how to determine constraints for each scene. In the Document U.S. Pat. No. 8,988,611 B1, this method can generate a screenplay that includes a sequence of scenes from input data.

In an example, the file that is used for the start of the processing described is the "custom-screenplay Notebook" in txt format, at the start of such processing from that file are obtained the markings. Then, the processing uses those markings to create the custom-screenplay Database in Excel format which has 2 tables, one for characters and the other for scenes; and also to create a custom-screenplay csv format files, e.g., the "custom-screenplay Characters_csv" and the "custom-screenplay Scenes_csv". Then compiles those two csv files to create the collections with their respective durations, together with the position of the audio files in the video editor.

Each section will help a person to distinguish the text. It will also help filmmakers to fully acknowledge the script, e.g., the number of the current scene, how many characters this scene has, what they are wearing, the environment, what is happening in the background.

The user can operate these editing tools with simple commands that can be typed with a keyboard. For instance, the editing tools can convert the document to other formats, can change the font for a specific phrase or word, instead of the standard black font.

In an embodiment, the disclosure comprises the following tools: Animation Tools for the selection of the animations and the duration of the scenes and the overall movie clips, Camera Tools to "animate" the camera to display what is currently happening and other options, Sound Clips/Movie Clips to select the audio/video files on its respective time slot and Text Strips for the subtitles based of the dialogue from the screenplay, the Render Panel which allows the user to select the shader/display for the viewport and the file's output, and lastly the CSV Panel that can compile the screenplay's database.

In an embodiment, the method disclosed requires the creation of environments and characters with armatures, inside the collections, where users insert a timestamp (hours-minutes-seconds-extra frames). Depending on the frame rate. For instance, for 60 frames per second, the range is between 0 and 59.

This method allows the direct implementation between screenplays and movies, meaning that by processing text from a script, it can deal with some factors of the film, such as the length of the scenes, the dialogue which is used for the subtitles, and the sound files which are loaded in their respective timestamps. It provides timestamps of each scene and character that appear in the timeline, instead of only focusing on the storyboards. By selecting a frame of the video, the user can input the data that was given in the form of timestamps. This can be applied to the runtime, the duration of each scene and the character actions, the positioning of the camera, and the insertion of movie/audio clips and text strips.

In an embodiment, if the user wants to maximize the time efficiency, it can import the CSV files that contain the information, and create all the existing scenes, times of day, and characters as collections with a corresponding duration of time, as well as the position of all audio strips throughout the timeline.

The disclosed invention enhances and accelerates the development of the movies, namely, animated movies, with the help of the text resources that were gathered chronologically, providing the timestamps of each scenes and characters that appear in the timeline, instead of only focusing on the storyboards. By selecting the frame rate for the video, the user can input the data that was given in the form of timestamps. This can be applied to the runtime, the duration of each scene and the character actions, the positioning of the camera, and the insertion of movie/audio clips and text strips.

BRIEF DESCRIPTION OF THE SEVERAL VIEWS OF THE DRAWINGS

The following figures provide preferred embodiments for illustrating the disclosure and should not be seen as limiting the scope of invention.

DESCRIPTION OF SPECIFIC EMBODIMENTS OF THE INVENTION

The method of developing a film through information is directed to improve the ability to turn a screenplay into a film, offering multiple tools to users. It can be used in all types of video projects, such as commercials and TV shows, as well as to work with a director when editing and organizing the video footage to show the results and to improve the final product. Like any editing software, it can edit, select, join and split content, and assist the syncing of raw footage and music.

By using a 3D computer graphics creation software (e.g. Blender), this method can take the resources of the 3D computer graphics as well as the film editing tools, and offers new instruments to develop animated film (Animation Tools deals with the animation of the characters, the environments, and the runtime of the movie clips; Camera Tools deals with the position of the camera throughout the timeline; Video Editing contains Movie Clips to import video clips; Sound Clips to import sound clips; Text Strips to add subtitles).

In an embodiment, the disclosed methods implemented in this invention aim for its usage in the film industry and in neuroimaging biomedical technologies.

In an embodiment, a video selection is made using a 3D computer graphics creation software, e.g. Blender which is Python programmable, Maya, Cinema 4D, and 3ds Max, which allows modelling/import of 3D models. These software contain tools that, with the disclosed method, do not require many resources.

In a particular embodiment, different tools from video-editing software, e.g., Blender, were integrated with the custom-screenplay software which allowed improved text-audio-"scene defining information"-"character location" integration.

The development of an animated film through information method requires a 3D computer graphics creation software add-on that integrates the video editing and the 3D computer graphics and offers tools to help the user to develop the animated film.

Figure 1:
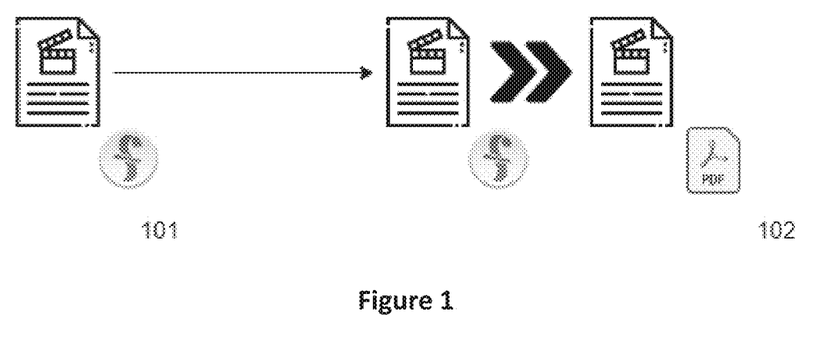
FIG. 1: Schematic representation of the pre-processing of the screenplay (101) and exporting step to PDF (102).
Figure 2:
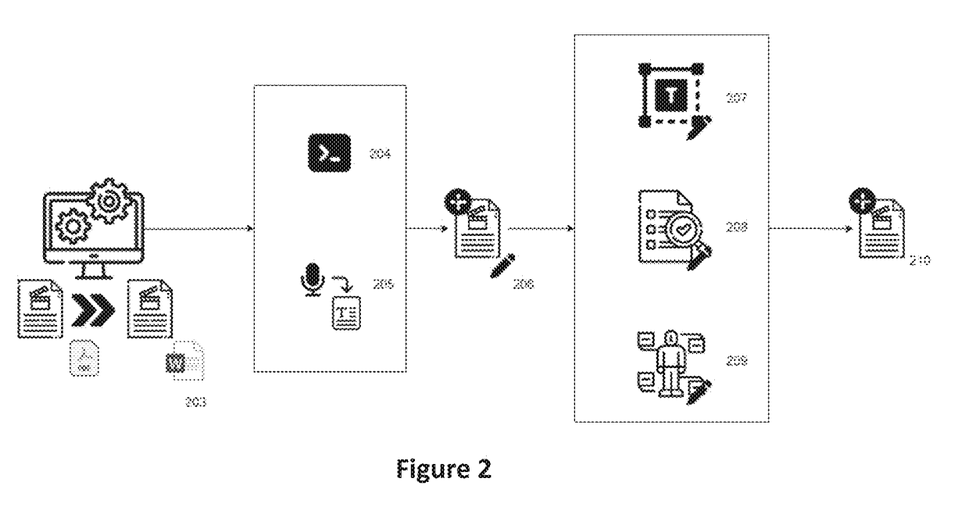
FIG. 2: Schematic representation of the creation of the custom screenplay (210), starting with the conversion (from PDF to DOCX format) (203), selection of command lines (204) or speech-to-text (205), editing of custom screenplays format (206), usage of the text editor tool (207), the action lines (208), and characters (209).

In an embodiment, the proposed method implies the pre-processing of the screenplay (101), which means that the full screenplay is complied, and it is exported to PDF format (102), before which the document is formatted by taking different characteristics of a certain character, displaying all sorts of information in a terminal and all the commands are inserted by typing on a keyboard after being prompted, which then starts the responses from a computer. In a preferred embodiment, the method receives Microsoft Word documents (DOCX), having the method included the option to convert a PDF file to DOCX (203). Thus, it works for any PDF document.

In a particular embodiment, the word document must have the ruler option turned on (with inches), as the program follows certain patterns to find specific data. For instance, the text on the left it is usually related to the information about the environment, the character or a scene; the text on the centre refers to the character's dialogue; and the text on the right is the transition between scenes or the page number.

Figure 3:
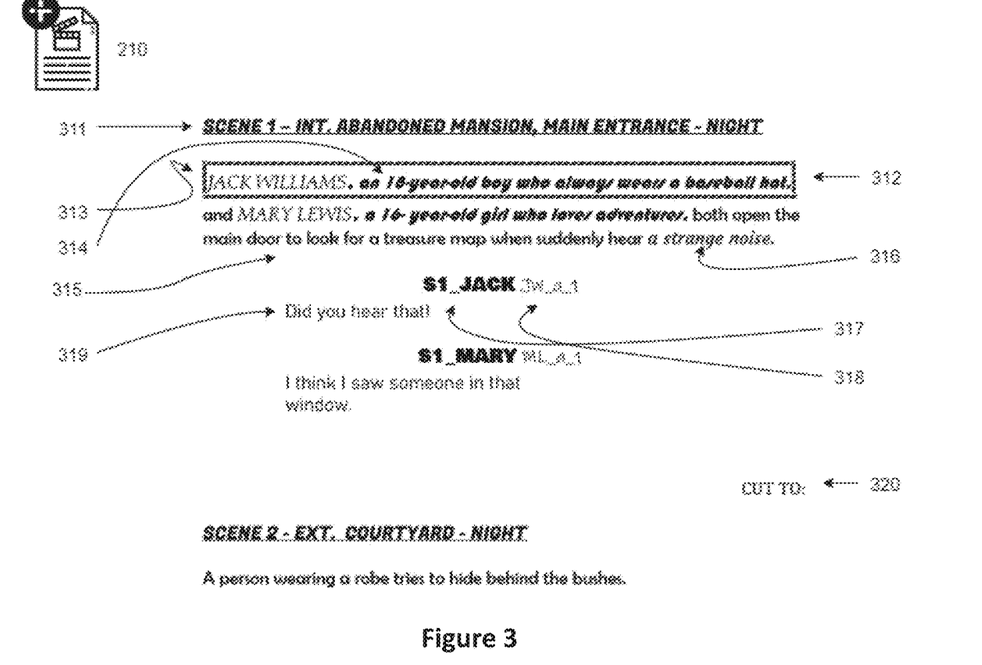
FIG. 3: Representation of the custom screenplay (210) structure, including the fields: scene heading (311); program analysing line (312); character name (313); character description (314); action lines (315); sound effects (316); character with scene number (317); character ID (318); dialogue lines (319); scene transitions (320).

In an embodiment, once the 3D computer graphics creation program starts, it asks the user if it prefers writing the text in the terminal or speech recognition, that is, the selection of command lines (204) or speech-to-text step (205). In the custom screenplay (210) there are different sections as it analysis and collects/adds data from the original script: action lines (315) to explain what is happening in the current scene; dialogue lines (319) for what the characters say; scene transitions (320); scene heading (311) to indicate the location and the time of day; names of characters (313) that appear in the scene; descriptions of the mentioned characters (314); background sounds effects (316) to fit in with the environment; character with the scene number reference (eg. S1_JOHN) (317) and the IDs for all the characters (318). The editor tool allows to replace a sentence or add a new paragraph in the custom screenplay with a certain selected font colour and/or style, i.e., to edit text fonts (207). If the user plans to search or replace a sentence, it must select the exact line, the program analysing line (312), and not the whole paragraph.

The editor tool includes three options for the text fonts: standard font colours, font styles for colour blind people or both. In a preferred embodiment, it is used Gold/Berlin Sans FB for action lines (315); Brown/Bahnschrift Light for dialogue lines (319); Dark Cyan/Cascadia Code Extra Light for scene transitions (320); Red/Fugaz One for scene heading (311); Blue/Book Antiqua for character names (313); Green/Bauhaus 93 for character descriptions (314); Pink/Courgette for background sounds (316); Purple/Bowlby One SC for character with scene number references (317); and Jade/Ink Free for characters IDs (318).

Once the user is done with the screenplay editing (206), it can save the custom screenplay (210) and even convert it back to PDF.

Figure 4:
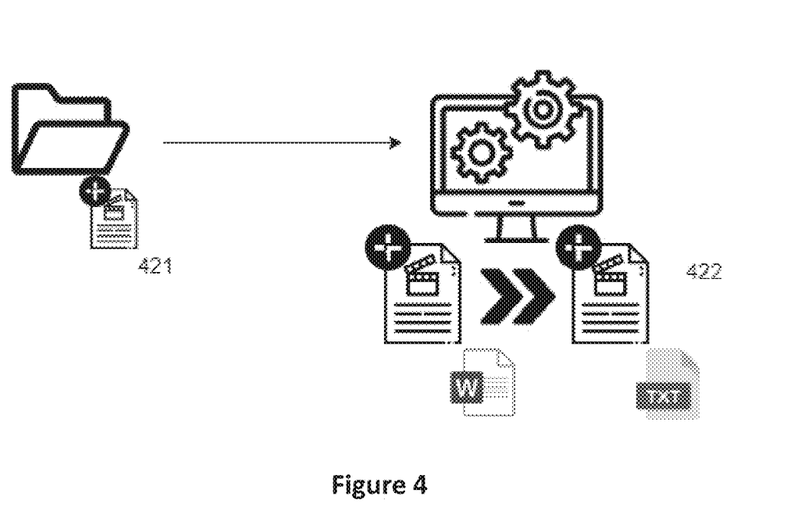
FIG. 4: Schematic representation of a custom screenplay modification to a regular notepad, including selecting the custom screenplay (421) and exporting to Notepad (TXT) (422).

After selecting the custom screenplay (421), the program can copy all the text and export it to a text file (422) like notepad (TXT).

Before it creates the database, the program asks again if the user prefers writing the text in the terminal or speech recognition, being this the step of selecting the command lines or speech-to-text.

In an embodiment, the process of speech-to-text comprises using the Microsoft™ voice-based resource, taking advantage of the targeting provided by the speech synthesizer (TTS). This approach allows to load the voices provided by Microsoft™ speech platform and with the implementation of a python script supported by the pyttsx3 library. It uses the Microsoft™ speech synthesizer to convert text into voice according to the voices existing in the TTS package existing in Windows™. The script loads and analysis an Excel file and analyses all the lines of columns of the lines, names and descriptions, to create the audio files (mp3) corresponding the lines of each character. By analysing the name and description, it is intended that the script implements a voice corresponding to the characteristics of each character, as well as the emotional component (joy, sadness, anger, fear, repulsion), thus generating a synthetic voice component (speech with emotion).

Approach still under study to solve problems such as: the shortage of voices to provide the lines to a complete script by the Microsoft™ synthesizer, emotional component is not adaptable to the synthesized voices, lack of adaptability of voices based on age groups making it possible to have voices of children, adolescents, youth, adults, and elderly for both genders. It was used as a possible solution Audacity to model the existing voices in order to generate other new voices, but the process is time consuming and ends up extending because of a new set of procedures within the Audacity environment, making it much more complex how to integrate all the processes in a single application of text to voice generation of a complete script.

In another embodiment, the synthesizing the voices of the complete script using free online text-to-speech synthesizers, building all the lines and sounds necessary for the production of the complete movie from an API that will do all the text conversion for each character in voice/speech/speech. Below is presented a table corresponding to the sound, the lines and sites used in an example.

TABLE 1

Example list of characters of a movie

| Name | Age | Gender | Characteristics | Voice | Website |
|---|---|---|---|---|---|
| 1- Roland Akhen | 40 | M | Tall and strong | M(Standard-J US) | TTSFree.com |
| 2- O.S | | F | Simulator | F(Standard-E US) | TTSFree.com |
| 3- Newcaster | | F | Young reporter | F(Standard-C US) | TTSFree.com |
| 4- Victor Vickah | 30 | M | Good looking | M(56 Jacob US) | TTSFree.com |
| 5- Alan Dobson | 50 | M | Bodacious, blond hair | M(55 Eric US) | TTSFree.com |
| 6- Raj | 17 | M | Young energetic | M(51 Brandon US) | TTSFree.com |
| 7- Roger Albrynn | 50 | M | Australian | M(25 William AU) | TTSFree.com |
| 8- John Williamson | 30 | M | | M(Standard-D US) | TTSFree.com |
| 9- Teresa Hausen | | F | Young | F(44 Jenny US) | TTSFree.com |
| 10- Nicolai Grosky | | M | Adult | Male(guy US) | TTSFree.com |
| 11- Stef Sghari | | M | Young | M(Standard-I US) | TTSFree.com |
| 12- Daniel | | M | Young | M(Standard-B US) | TTSFree.com |
| 13- Charles | | M | Young | M(Christopher US) | TTSFree.com |
| 14- Saria Akhen | 5 | F | Child | Ivy | Texvoz.online |
| 15- Alesophia Akhen | 31 | F | Young | Joanne | Texvoz.online |
| 16- Yuschenko | 50 | M | | Male, Mathew | Texvoz.online |
| 17- News Anchor | | F | | Aria | Texvoz.online |
| 18- Zachariah | 50 | M | Piercing eyes | Male, B | Texvoz.online |
| 19- Raj | 30 | M | Strong | man, guy | Texvoz.online |
| 20- Inya | 30 | M | Jet pilot | benjamin | Texvoz.online |
| 21- Raimon Forrest | 12 | M | Thin | Man, Justin | Texvoz.online |
| 22- Vishnu | 12 | M | Bodacious | 32 H K Male Sam hk | TTSFree.com |
| 23- William Drakni | 60 | M | Pale, cold face | 27Man, Liam(ca) | TTSFree.com |
| 24- Uber Officer | 25 | M | Young | 34Man Connor(ie) | TTSFree.com |
| 25- Saria Akhen | 12 | F | Adolescent | Sally | Texvoz.online |
| 26- Automatic voice | | F | AVA | 24woman, Natasha(au) | TTSFree.com |

TABLE 1-continued

Example list of characters of a movie

| Name | Age | Gender | Characteristics | Voice | Website |
|---|---|---|---|---|---|
| 27- Saria/Sophiel | | F | Young | 39FStandard-G(us) | TTSFree.com |
| 28- Cell voice | | F | | Woman, Sarah/o.sttsfree | Texvoz.online |
| 29- Security | | M | | UKman, Ryan(gb) | TTSFree.com |
| 30- Drakni// | | M | | Man, Jacob | Texvoz.online |
| 31- Uber Pilot | | M | | 38Man, Mitchell(nz) | TTSFree.com |
| 32- Sence | | M | | 49Man, StandardB(ca) | TTSFree.com |
| 33- Military Ruach 1 | | M | | 22Man, Standard-B(au) | TTSFree |
| 34- Military Ruach 2 | | M | | 24Man, Standard-D(au) | TTSFree |
| 35- Military Ruach 3 | | M | | M(Standard-B US) | TTSFree.com |
| 36- Military Ruach 4 | | M | | M(Christopher US) | TTSFree.com |
| 37- Fatima | | F | | 40FStandard-H(us) | TTSFree |
| 38- Young Soldier | | M | | 41M(Standard-I US) | TTSFree.com |
| 39-Norad Cmr | | M | | Man, Joe | Texvoz.online |
| 40- Amuk | | M | | Man, J | Texvoz.online |
| 41- Parkemon | | M | | Man, A | Texvoz.online |
| 42- Vichai | | F | | Woman, Amber | Texvoz.online |
| 42- Momtahg | | M | | Man, Mattwen standard | Texvoz.online |
| 43- Paolo Mazzio | | M | | Man, I | Texvoz.online |
| 44- Peter | | M | | Man, Jacob | Texvoz.online |
| 45- Uber Technician | | M | | M(55 Eric US) | TTSFree.com |
| 46- Uber Lower | | M | | Man, gui | Texvoz.online |
| 47- Aki | | F | Child | Man, Justin | Texvoz.online |
| 48- Kari | | F | Child | Woman, Ivy | Texvoz.online |
| 49- LoudSpeaker voice | | | | M(Standard-B US) | TTSFree |
| Vishnu | | M | Young | 30Man, StandardB UK | TTSFree.com |
| Raimon | | M | Young | 32Man, StandardD UK | TTS |
| Automatic reply | | | | F(Standard-E US) | TTSFree |
| Crowd | | | | M(Standard-B US) | TTSFree.com |

As an example the sounds necessary for the production of a movie are: heavy breathing, clearer breaths, someone in danger, fire crackling, disintegrating star ships, fireman siren, loud breathing, moaning of people in pain in the background, increased breathing, screaming, ceiling collapsing, man dying, carnage shooting, people in agony, stair tripping (falling down), marches, shouting commands, amused laughter, telephone ringing, ship taking off, ship motion, quick footsteps, someone running, engines, humming of a ship's reactors, Gregorian and Buddhist chants, loudspeaker voice (O.S), deep breathing, panic and chaos, doors opening, strong gust of air, explosion, blaster firing, screams of agony, loudspeaker voice (orientations), crowd.

In a further embodiment, the process of speech-to-text consists of training deep neural networks for natural language processing, specifically the synthetization of numerous voices as needed and scripts to use the text to speech converter developed by us.

Figure 5:
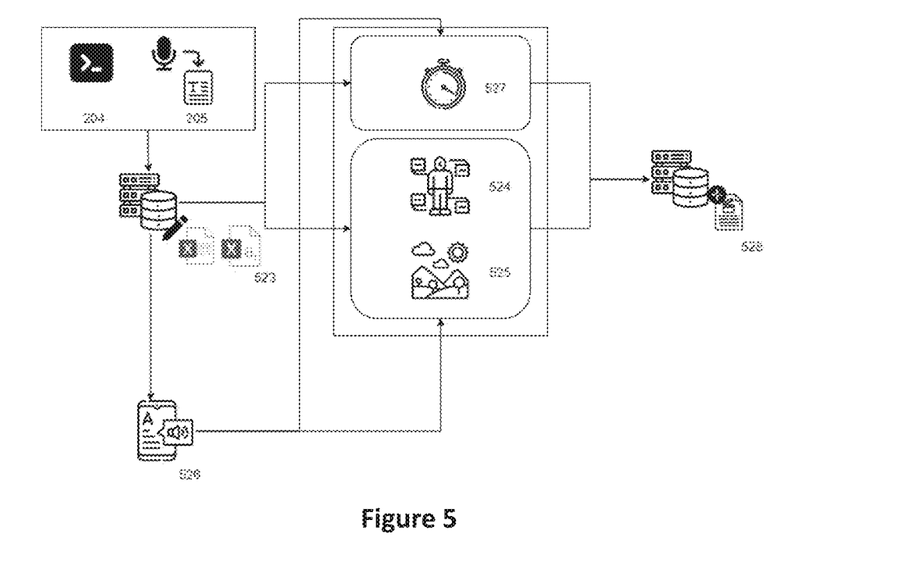
FIG. 5: Schematic representation of the creation of the screenplay's database, including the steps of selecting the command lines (204) or speech-to-text (205), designing the database's structure with excel (XLSX) and Comma-separated values (CSV) (523), establishment of the character table (ID, character in action) (524) and scene table (scene number, time of day) (525), usage of Text to Speech (526), insertion of timestamps (for characters and scenes) (527) and conversion to the Screenplay database (528).

In a preferred embodiment, it uses Microsoft Excel (XLSX) and Comma-separated values (CSV) to store data and analyse it, using 2 tables for the XLSX and two CSV files, and ultimately designing the database structure (523).

In an embodiment, the database (523) comprises all the information from the screenplay in the form of character tables (ID, character in action) (524) and scene tables (scene number, time of day) (525).

In an embodiment, while compiling the script line by line with Text-to-Speech (526), every time it encounters a specific word, it places a timestamp on the database for characters and scenes (527) on the template so that the user has a general idea on where it can place the characters and the environment on the timeline.

Once the program compiles the entire screenplay and converts it into the screenplay database, the database will be completed (528).

Figure 6:
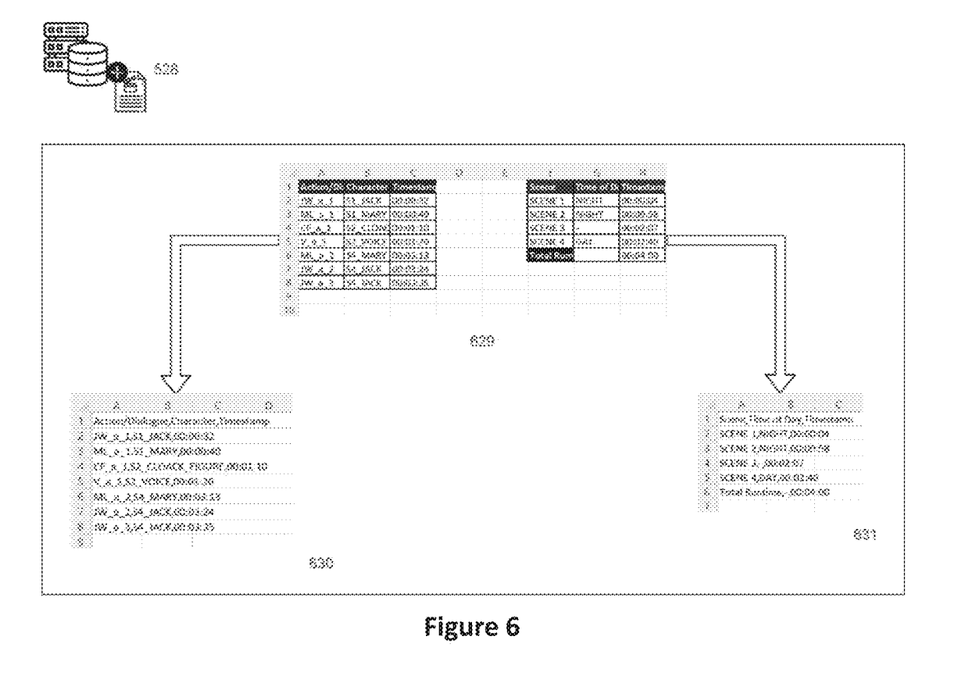
FIG. 6: Representation of the screenplay's database (528) structure, including the screenplay data in XLSX format (629), the character data in CSV format (630) and the scene data in CSV format (631).

The screenplay database structure consists of 3 files: the entire screenplay data in XLSX format (629), the character data in CSV format (630), and the scene data in CSV format (631).

Figure 7:
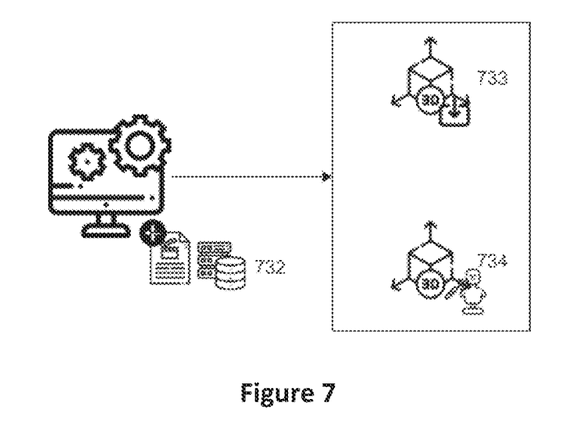
FIG. 7: Schematic representation of the creation of collections with 3D models, including the steps of generating new collections based on the custom screenplay and the database (scenes/time of day/characters) (732), importing 3D models (733) and Modelling/Sculpting 3D models (734).
Figure 8:
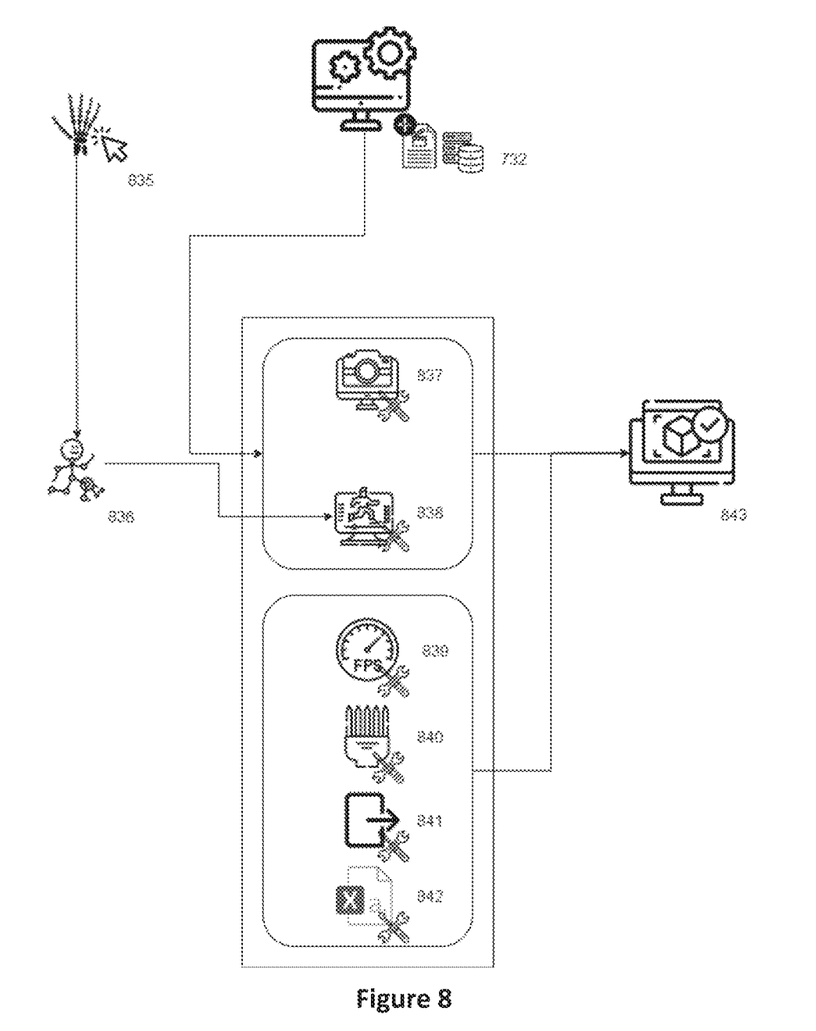
FIG. 8: Schematic representation of rigging of models and usage of the animation and camera tools, including the steps of generating new collection(s) (732), rigging character model (Armature/Skeleton) (835), animating character/collection (836), usage of Camera Tools (locking on 3D cursor and camera to view, camera positioning, camera lens) (837), and Animation Tools (runtime of render, duration of environments, selection of characters and animations within the library) (838), selection of frame rate (839), shader of the 3D viewport (840), output of videos (841), and CSV files (842), and rendering the viewport (843).

A user, e.g., a filmmaker, can generate new collections (732) and import 3D models (733) or model/sculpt 3D models (734) for the new environments and characters. Each character has an armature (835).

This method can associate a timestamp, e.g., in seconds, with a respective frame(s), so when users insert a timestamp, the program converts that value and place it in the timeline, using the camera tools (locking on 3D cursor and camera to view, camera positioning, camera lens) and animation tools (runtime of render, duration of environments, selection of characters and animations within the library).

Once the user animates a character (836), the animation is stored in a library.

In the Animation tools, the runtime: Start and End panel allows filmmakers to choose the frame range for the movie rendering; the collections panel "animates" collections with frames, so that each scene can appear and disappear for a certain amount of time; the 3D models panel simply allows the user to import/export objects in FBX or OBJ format; the Action timeline panel allows users to select the name of character's armatures and animations (838) with level of intensity from 0 to 3, and the position on the timeline.

In the Camera Tools, the View Lock panel locks the camera at the cursor and enables the view navigation within the camera: the Lens panel change the lens type and its unit; the Frames panel where users can insert the frame of the camera from its position (837).

Additionally, they can also select the frame rate for the rendering (839), the viewport shader for the style of the environments (840), the output for the rendered videos (841), and the CSV files to compile the data and create collections with transitions, as well as the positioning of the audio strips for the video editing (842).

Figure 9:
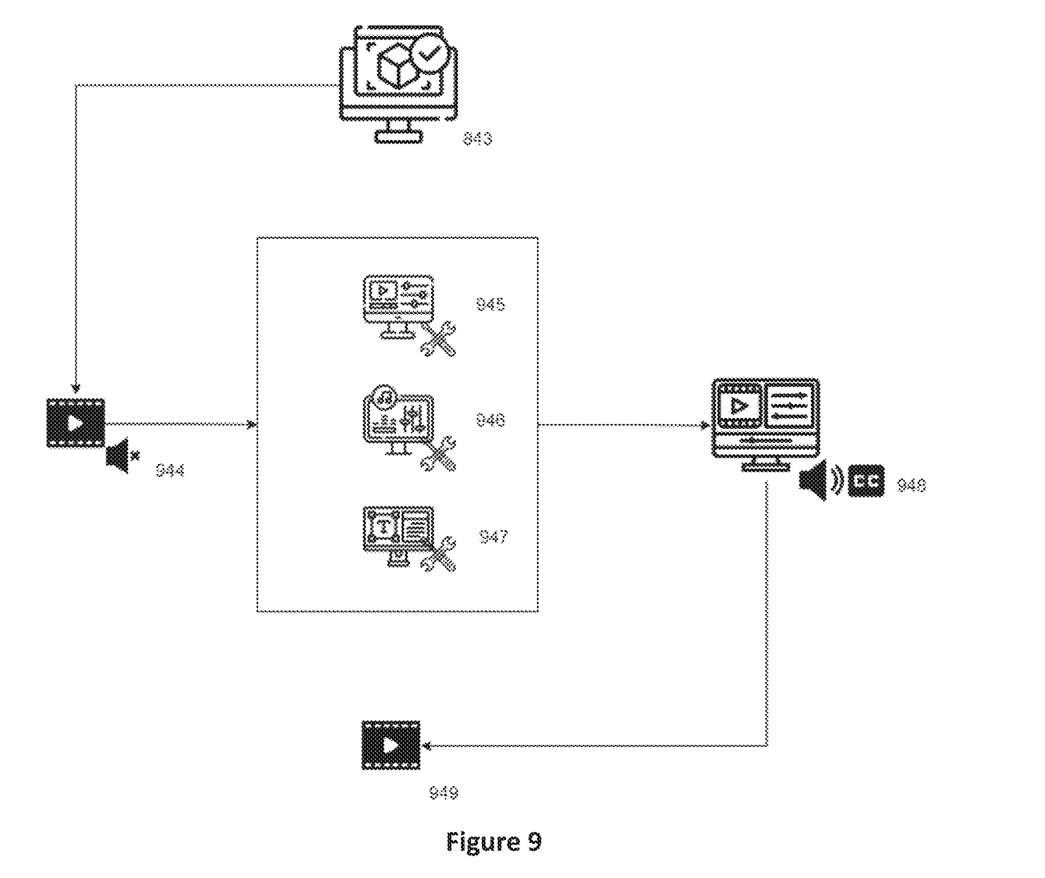
FIG. 9: Schematic representation of the development of the animated film, including rendering the viewport (843), making Of movie clip(s) (no audio) (944), video Editing, namely Movie Clips (selection of video files, frame positioning) (945), Sound Clips (selection of audio files, frame positioning) (946), and Text Strips (writing subtitles, range of text, style and layout) (947), rendering the sequence (with subtitles and audio) (948) and making of Animated film (final product) (949).

Once the animation and the camera tools are implemented, the user then renders the viewport (843) which will result in getting movie clips with no audio (944).

After selecting the Movie Clips with no audio (944), the user can insert an MP4 file and the timestamp, in the video editing (945).

Also in this step, in the Sound Clips, the user can insert an MP3 file and the timestamp to add sounds or dialogue in the movie (946).

Finally, in the Text Strips, the user can write any text like titles and subtitles and choose its length with the time start and end options. It also includes 2 additional subpanels: the style option selects the font size and colour, and the layout selects the position of the text (947).

Once the sound and the text tools are implemented, the user then renders the video sequence (948) to get the final product, animation movies with audio and subtitles (949).

With this disclosure, it is possible to develop animated films, with the help of text resources that were collected chronologically, providing the accurate temporal peaks of each scene and characters that appear in the timeline, instead of focusing only on storyboards. When selecting a frame rate for the video, the user can enter the data that was given in the form of "time markers". This can be applied to runtime, duration of each scene and character actions, camera placement and the insertion of movie/audio clips and text strips.

In a particular embodiment, the method is implemented as an add-on program, using video editing and 3D computer graphics resources to develop animated video clips, being capable to operate with databases that contain information from several screenplay formats, such as movies, TV shows, commercials and so on.

It allows the integration of the text-audio-movie, meaning that if the user wants to insert a scene based on a screenplay, the user can simply write it in the operator instead of doing it manually in the 3D layout. This also applies to the video editing section, where users can import audio and text by simply inputting the respective timestamps, instead of dragging the audio/text strips manually to see if they match with the scene.

In an embodiment, using the Blender software, this method can select the different actions that exist in the library, and although this program doesn't create animations for the character's armature/skeleton, the video that the user implements can change depending on the information the user puts, such as the different animation actions and the emotion levels.

This method guarantees the real-time interaction between users, screenplays, and movie clips, giving an overall insight of the project to improve the final product.

The term "comprising" whenever used in this document is intended to indicate the presence of stated features, integers, steps, components, but not to preclude the presence or addition of one or more other features, integers, steps, components, or groups thereof.

The disclosure should not be seen in any way restricted to the embodiments described and a person with ordinary skill in the art will foresee many possibilities to modifications thereof. The above-described embodiments are combinable.

The following claims further set out particular embodiments of the disclosure.

The invention claimed is:

1. A computer-implemented method to generate a database for synchronization of a text, a video or audio media—individually or in combination—with a video stream to be generated using said database, comprising the steps of:
   receiving an input text comprising a screenplay or other structured script document;
   splitting the input text into text segments by detecting line breaks, tabs, spaces, text columns, or combinations thereof in the formatted document;
   clustering the text segments into at least one text group, wherein each text group represents a movie scene, time of day, action line, dialogue line, character, musical score, sound effect, or a combination thereof as extracted from the screenplay;
   labelling each text segment with a sequential timestamp; and,
   storing each text segment with the label on a data record; wherein the input text is split for each line break, tab, space, text column, or their combination;
   wherein a text group comprises at least one text segment; wherein the text group comprises a time interval label; wherein the time interval of the text group corresponds to the duration of at least a portion of a video or audio media and is usable by a 3D animation and video editing tool to position corresponding video, audio, and subtitle elements automatically on the timeline.

2. The method according to the previous claim 1, wherein the time interval label of a text group comprises the timestamp of the first text segment and the timestamp of the last text segment as stored in the database tables.

3. The method according to claim 1 wherein the time interval label of a text group is provided by a user through a video editing of the 3D animation software.

4. Method according to claim 1 wherein the text group represents a movie scene, a time of day, an action line, a dialogue line, a character, a musical score, a sound effect, or a combination of any of the previous.

5. Method according to claim 1 wherein the database comprises only one text group.

6. Method according to claim 1 wherein the input text is generated from a speech or narration by a user to text.

7. Method according to claim 1 further comprising a pre-processing step of the input text, preferably by converting a docx, pdf, or txt file.

8. Method according to claim 1 wherein the input text is a screenplay.

9. The computer-implemented method, according to claim 1, wherein a user selects a frame from the video or audio media;
   identifying a timestamp of said frame;
   retrieving from said database the text group which comprises that timestamp; and,
   outputting the text group related with the selected frame.

10. Method according to the previous claim 9, further comprising:
receiving a text input from a user;
adding the text input to a text group.

11. Method according to claim 1 further comprising:
receiving an audio media from a user;
overlapping the received audio media with at least a portion of the audio of the video on said timestamp.

12. A system to generate a database for synchronization of a text, a video or an audio media, comprising an electronic data processor configured to carry out the method of claim 1.

13. A computer program product stored in a non-transitory computer readable medium comprising computer instructions that, when executed by the processor, carry out the method according to claim 1.

* * * * *